US006955316B2

(12) United States Patent
Kitajima

(10) Patent No.: US 6,955,316 B2
(45) Date of Patent: Oct. 18, 2005

(54) REEL UNIT FOR SPINNING REEL

(75) Inventor: Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 145 days.

(21) Appl. No.: 10/322,617

(22) Filed: Dec. 19, 2002

(65) Prior Publication Data

US 2003/0146325 A1 Aug. 7, 2003

(30) Foreign Application Priority Data

Feb. 5, 2002 (JP) ....................................... 2002-028219

(51) Int. Cl.$^{7}$ ................................................ A01K 89/02

(52) U.S. Cl. ........................ 242/311; 242/312; 242/316

(58) Field of Search ................................ 242/311, 312, 242/313, 314, 315, 316, 310

(56) References Cited

U.S. PATENT DOCUMENTS

| | | | | | |
|---|---|---|---|---|---|
| 5,350,130 | A | * | 9/1994 | Hitomi et al. | 242/241 |
| 5,443,571 | A | * | 8/1995 | Kang | 242/311 |
| 5,683,051 | A | * | 11/1997 | Hitomi et al. | 242/311 |
| 6,059,211 | A | * | 5/2000 | Young | 242/241 |
| 6,102,317 | A | * | 8/2000 | Bernard et al. | 242/319 |
| 6,641,070 | B1 | * | 11/2003 | Wong | 242/312 |

FOREIGN PATENT DOCUMENTS

| | | | | |
|---|---|---|---|---|
| GB | 2264852 | * | 9/1993 | 242/311 |
| JP | 5-146239 | * | 5/1993 | 242/311 |
| JP | 10-004836 | | 1/1998 | |

* cited by examiner

*Primary Examiner*—Emmanuel Marcelo
(74) *Attorney, Agent, or Firm*—Shinjyu Global IP Counselors, LLP

(57) ABSTRACT

A reel unit for a spinning reel has a casing and a lid portion. The casing has an opening formed in its side portion, a mechanism accommodating space formed inside, and a rotation support portion for supporting a rotation shaft (pinion gear) of the rotor. The lid portion has a cover portion and a mounting leg portion. The cover portion is mounted detachably to the casing to cover the opening of the casing. The cover portion is formed unitarily with a second flange portion so as to define a space in the interior thereof. The mounting leg portion extends from the cover portion and to the front end of which a fishing rod can be mounted. In this reel unit, the weight of the lid portion is reduced at low cost while precision and relative strength are maintained.

20 Claims, 9 Drawing Sheets

REEL UNIT FOR SPINNING REEL

BACKGROUND OF THE INVENTION

1. Field of the Invention

This invention generally relates to reel units. More specifically, the present invention relates to reel units for spinning reels mounted to a fishing rod that winds fishing line onto its spool with a rotor that rotates in cooperation with rotation of a handle.

2. Background Information

Generally, spinning reels have a reel unit, a rotor rotatably supported by the reel unit, and a spool that is arranged in front of the rotor and on the outer periphery of which fishing line is wound by the rotor. The reel unit has a handle for rotating the rotor.

A reel unit generally has a casing and a mounting leg portion that are formed unitarily from an injection-molded synthetic resin or die-cast aluminum, and a cover portion. The casing accommodates a drive portion and has an opening for mounting the drive portion. The mounting leg portion has a leg portion extending upward from the casing and a fishing rod-mounting portion extending frontward and rearward from the tip of the leg portion. The cover portion is provided for covering the opening of the casing. The rotor is supported rotatably by the casing and is driven to rotate by a drive mechanism provided therein. The spool is supported by the casing so that it can shift back and forth, and an oscillating mechanism is provided therein to shift the spool back and forth. The rotation shaft of the handle is supported rotatably by the casing and the cover portion.

This type of spinning reel is required to be lightweight and be formed with a high degree of precision. As far as the casing is concerned, reduced weight and a high degree precision can be achieved when the wall thickness is reduced to reduce sink marks during the molding. However, the mounting leg portion needs to have a large wall thickness to maintain the relative strength. In the conventional configuration, however, the casing and the mounting leg portion are formed unitarily, and therefore, the casing is stretched by the thick-walled mounting leg portion during the molding. As a result, variation in thickness is caused in the thin-walled casing if the wall thickness of the casing is reduced to attain weight reduction and increased precision. For this reason, molding strain or non-uniform contraction is caused in the casing, which needs to be formed with a high degree of precision, and consequently, it is difficult to maintain a high degree of precision. If the wall thickness of the mounting leg portion is reduced in order to avoid this problem, the relative strength of the mounting leg portion is reduced and the mounting leg portion might be easily damaged. If the mounting leg portion is provided separately from the casing, the joint portion between the mounting leg portion and the casing needs to have large strength, necessitating a complex structure in the joint portion.

To address these issues, a reel unit for a spinning reel having a lid portion in which the cover portion and the mounting leg portion are formed unitarily is disclosed in Japanese Unexamined Patent Publication No. 10-004836. By providing the casing separately, it is possible to reduce the wall thickness of the casing and maintain a high degree of precision. Moreover, by forming the mounting leg portion unitarily with the cover portion, which does not need to be formed with so high a degree of precision, it is possible to increase the wall thickness of the mounting leg portion and to maintain the relative strength of the mounting leg portion.

In the conventional configuration, the lid portion formed unitarily with the mounting leg portion is made of metal, which has a high relative strength, to maintain a high degree of precision and relative strength. However, with a lid portion made of metal, if reduction in weight is desired while maintaining a high degree of precision and relative strength, it is necessary to use expensive metals such as titanium or the like, increasing the manufacturing cost.

In view of the above, there exists a need for reel unit for spinning reel which overcomes the above mentioned problems in the prior art. This invention addresses this need in the prior art as well as other needs, which will become apparent to those skilled in the art from this disclosure.

SUMMARY OF THE INVENTION

A purpose of the present invention is to provide a reel unit for a spinning reel having a lid portion in which a cover portion and a mounting leg portion are formed unitarily, in which the weight of the lid portion is reduced at low cost while maintaining a high degree of precision and relative strength.

A reel unit for a spinning reel according to the first aspect of the invention is a reel unit for a spinning reel, which is mounted to a fishing rod and is for winding fishing line onto a spool by a rotor that rotates in cooperation with rotation of a handle. The reel unit comprises a casing, a lid portion, and a wall portion. The casing includes an opening formed at its side, a mechanism accommodating space formed therein, and a rotation support portion for supporting a rotation shaft of the rotor, the rotation support portion formed so as to be arranged inside a circular hollow formed at the reel unit side of the rotor. The lid portion has a cover portion and a mounting leg portion, the cover portion detachably fixed to the casing, covering the opening of the casing, and formed unitarily with a wall portion formed at its side to which the rotor is mounted so that a space is formed inside, and the mounting leg portion extending from the cover portion and having a front end to which the fishing rod can be attached.

In this reel unit, the cover portion is formed unitarily with the mounting leg portion for mounting a fishing rod, and the wall portion is formed at the side of the cover portion to which the rotor is mounted that is formed so as to cover the opening. Thus, in the cover portion, the wall portion is formed unitarily at the side to which the rotor is mounted in addition to the portion covering the opening, and consequently, the entire cover portion has a box-like shape enclosing a space therein. Therefore, stress is distributed and the relative strength of the cover portion is increased. Moreover, because stress is distributed, deformations do not occur easily during the molding and a high degree of precision can be maintained. Accordingly, even if the lid portion including the cover portion is made of a synthetic resin or an aluminum alloy, which has a low relative strength, it is possible to maintain a high degree of precision and relative strength. Furthermore, if the lid portion including the cover portion is made of an aluminum alloy or a synthetic resin, the weight of the lid portion can be reduced at low cost.

According to the second aspect of the invention in the reel unit for a spinning reel as set forth in the first aspect, a circular flange portion having a first flange portion and a second flange portion, the first flange portion arranged on substantially the same plane as the end face of the hollow and provided at the casing, and the second flange portion provided at the wall portion such that the first and second flange portions cover the hollow. In this case, the flange portion can prevent foreign matter such as water or liquids from entering the hollow.

According to the third aspect of the invention, in the reel unit for a spinning reel as set forth in the second aspect, the second flange portion is formed unitarily the wall portion. In this case, since the second flange portion and the wall portion are formed unitarily, it is possible to increase the relative strength of the cover portion by providing the second flange portion.

Alternatively, the second flange portion can be provided separately from the wall portion. In this case, washing and lubricating the inside of the hollow of the rotor can be carried out easily since only the second flange portion needs to be detached.

According to the fourth aspect of the invention, in the reel unit for a spinning reel as set forth in any one of second through third aspects, the first flange portion is formed unitarily with the casing. In this case, because the casing and the first flange portion are formed unitarily, the relative strength of the casing is high.

Alternatively, the first flange portion can be provided separately from the casing. In this case, washing and lubricating the inside of the hollow of the rotor can be easily carried out since only the first flange portion needs to be detached.

According to the fifth aspect of the invention, in the reel unit for a spinning reel as set forth in any one of the first through fourth aspects, the casing and the lid portion are made of a synthetic resin. In this case, the weight of the lid portion can be reduced while a high degree of precision and strength are maintained, and at the same time, the cost of the casing can be reduced since the casing is made of a synthetic resin. Alternatively, the casing and the lid portion can be made of a light weight metal such as aluminum alloy.

According to the seventh aspect of the invention, in the reel unit for a spinning reel as set forth in any one of the first through sixth aspects, the cover portion has a trimmed portion formed continuously with the second flange portion and formed on the circumference facing the opening. In this case, the relative strength is further increased with the trimmed portion.

According to the eighth aspect of the invention, in the reel unit for a spinning reel as set forth in any one of first through seventh aspects, the lid portion has a handle support portion for supporting the handle. In this case, the need for providing a protrusion for supporting a shaft is eliminated since the cover portion only needs to serve the function of mere covering. As a result, thickness variation in the cover portion is small, and the lid portion can be easily manufactured.

According the tenth aspect of the invention, in the reel unit for a spinning reel as set forth in any one of the first through ninth aspects, the casing has a handle support portion for supporting the handle. In this case, the handle support portion is formed unitarily with the mounting leg portion, which requires strength, and therefore, the weight and the wall thickness of the casing can be reduced while a high degree of precision is maintained. In addition, since the handle is supported by the lid portion and the casing, the handle can be mounted from either the left or the right side of the reel unit.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

First Embodiment

Figure 1:
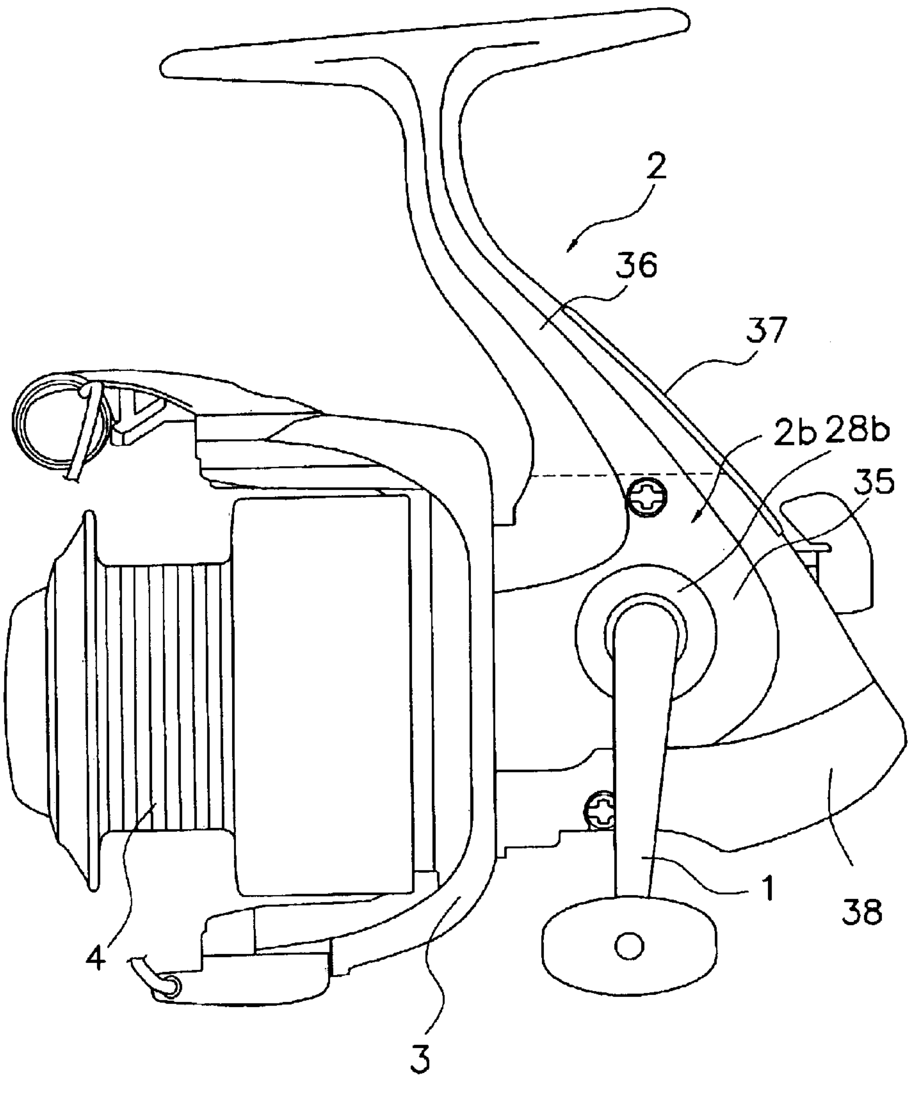
FIG. 1 is a side view of a spinning reel according to a first embodiment of the present invention.
Figure 2:
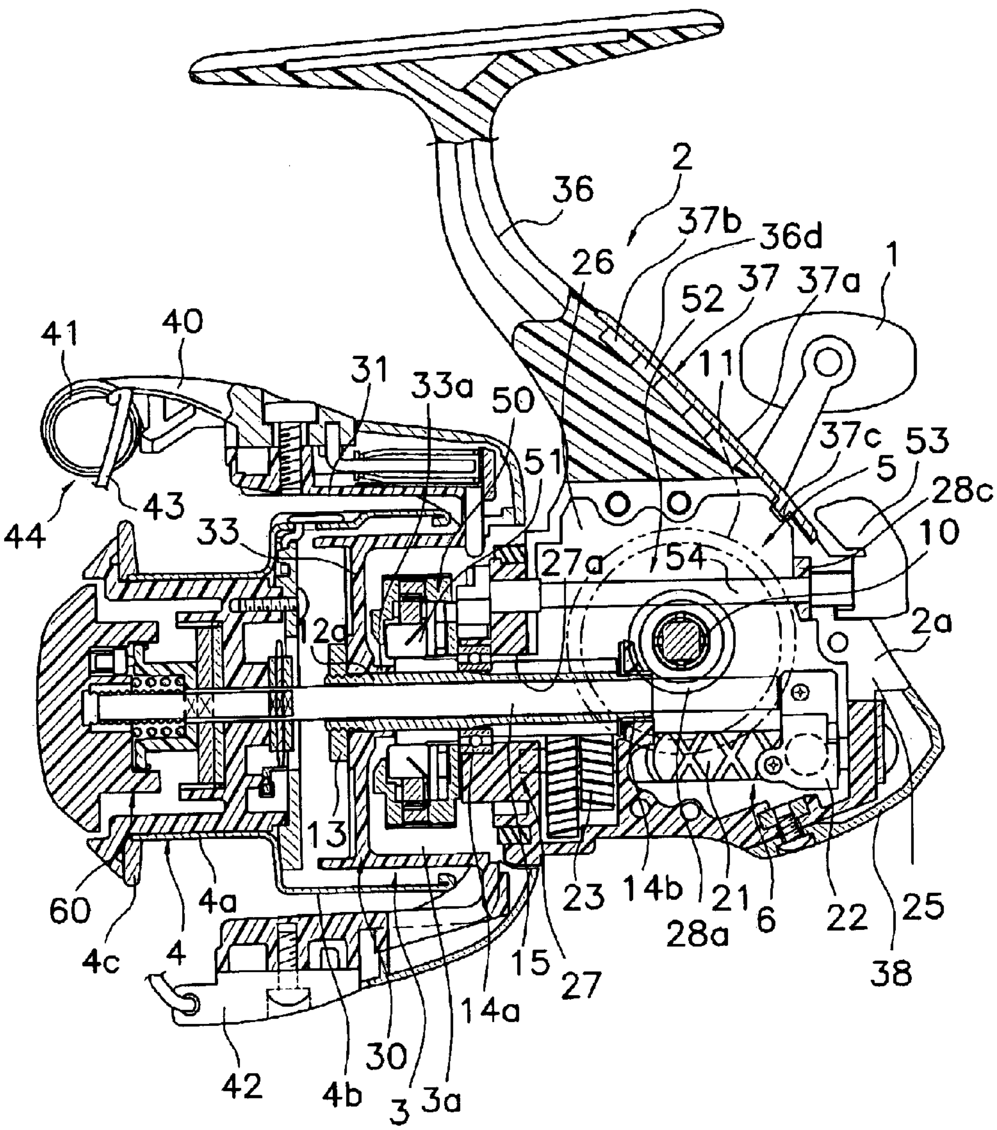
FIG. 2 is a cross-sectional side view of the spinning reel according to a first embodiment of the present invention.

As shown in FIGS. 1 and 2, a spinning reel in accordance with a first embodiment of the present invention includes a handle 1, a reel unit 2 rotatably supporting the handle 1 and mounted to a fishing rod, a rotor 3, and a spool 4. The rotor 3 is for winding the fishing line around the spool 4, and is rotatably supported at the front of the reel unit 2. The fishing line is wound around the outer peripheral surface of the spool 4, which is disposed at the front of the rotor 3 and can be shifted back and forth. It should be noted that the handle 1 can be attached to the left side of the reel unit 2 as shown in FIG. 1, or to the right side of the reel unit 2 as shown in FIG. 2.

The reel unit 2 principally includes, as shown in FIGS. 1 through 5, a casing **2*a* for supporting the rotor 3 and the spool 4, a lid portion 2*b* detachably screwed to the casing 2*a*, a circular flange portion 2*c* having a first and a second flange portions 24*a* and 24*b* respectively formed unitarily with the casing 2*a* and the lid portion 2*b***.

Figure 3:
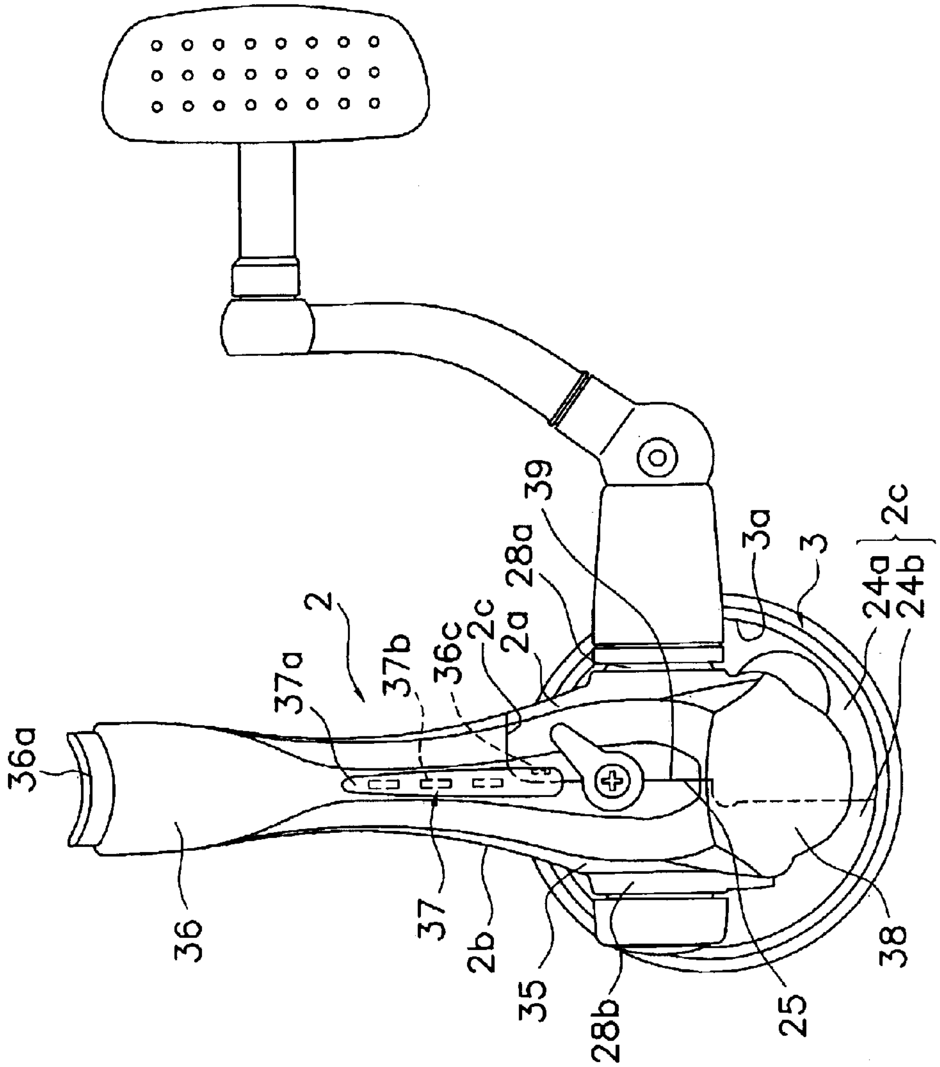
FIG. 3 is a rear view of the spinning reel according to a first embodiment of the present invention.
Figure 4:
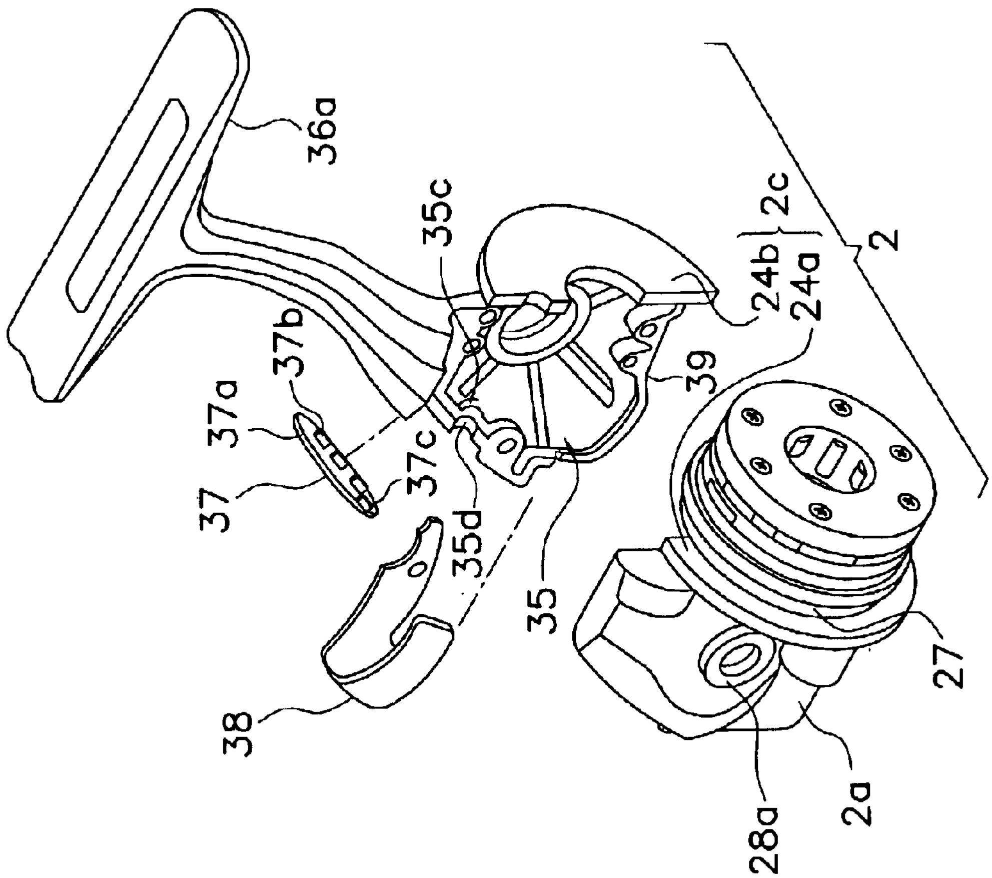
FIG. 4 is an exploded oblique view of a reel unit according to a first embodiment of the present invention.
Figure 5:
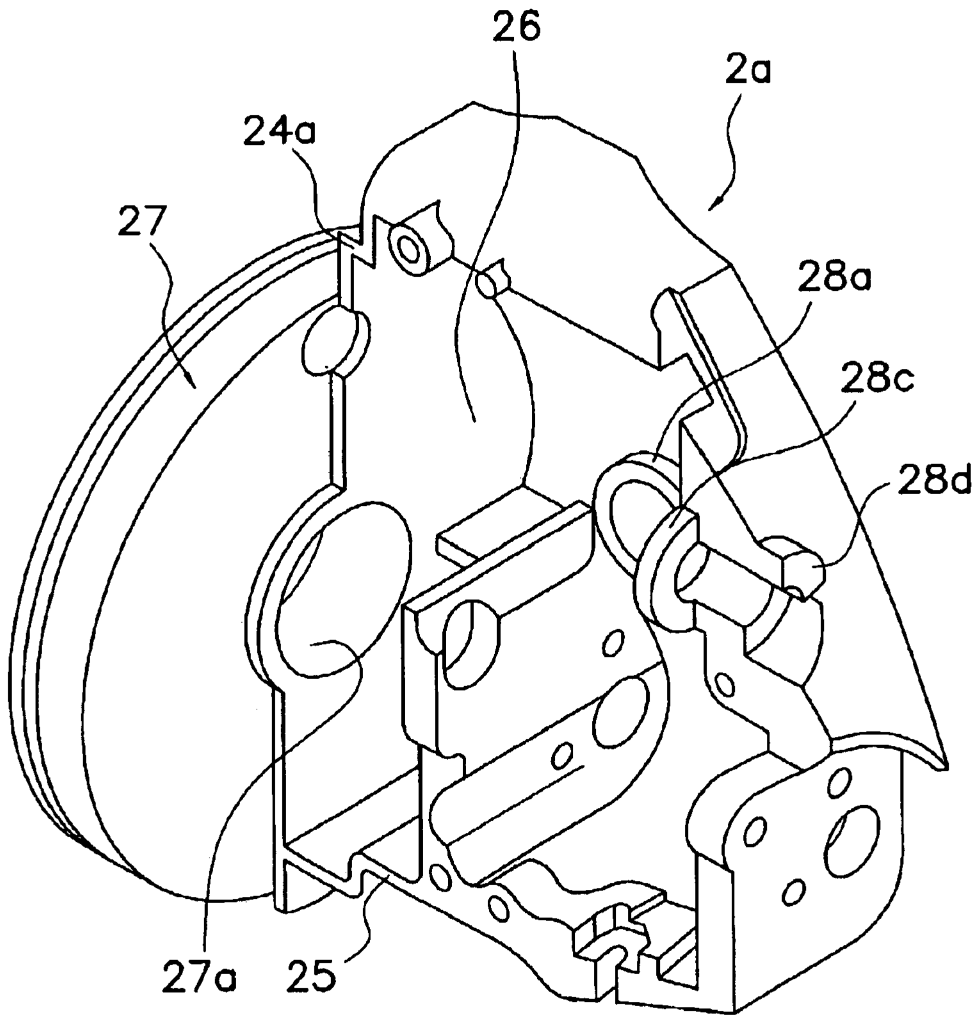
FIG. 5 is an oblique view of the casing according to a first embodiment of the present invention.
Figure 6:
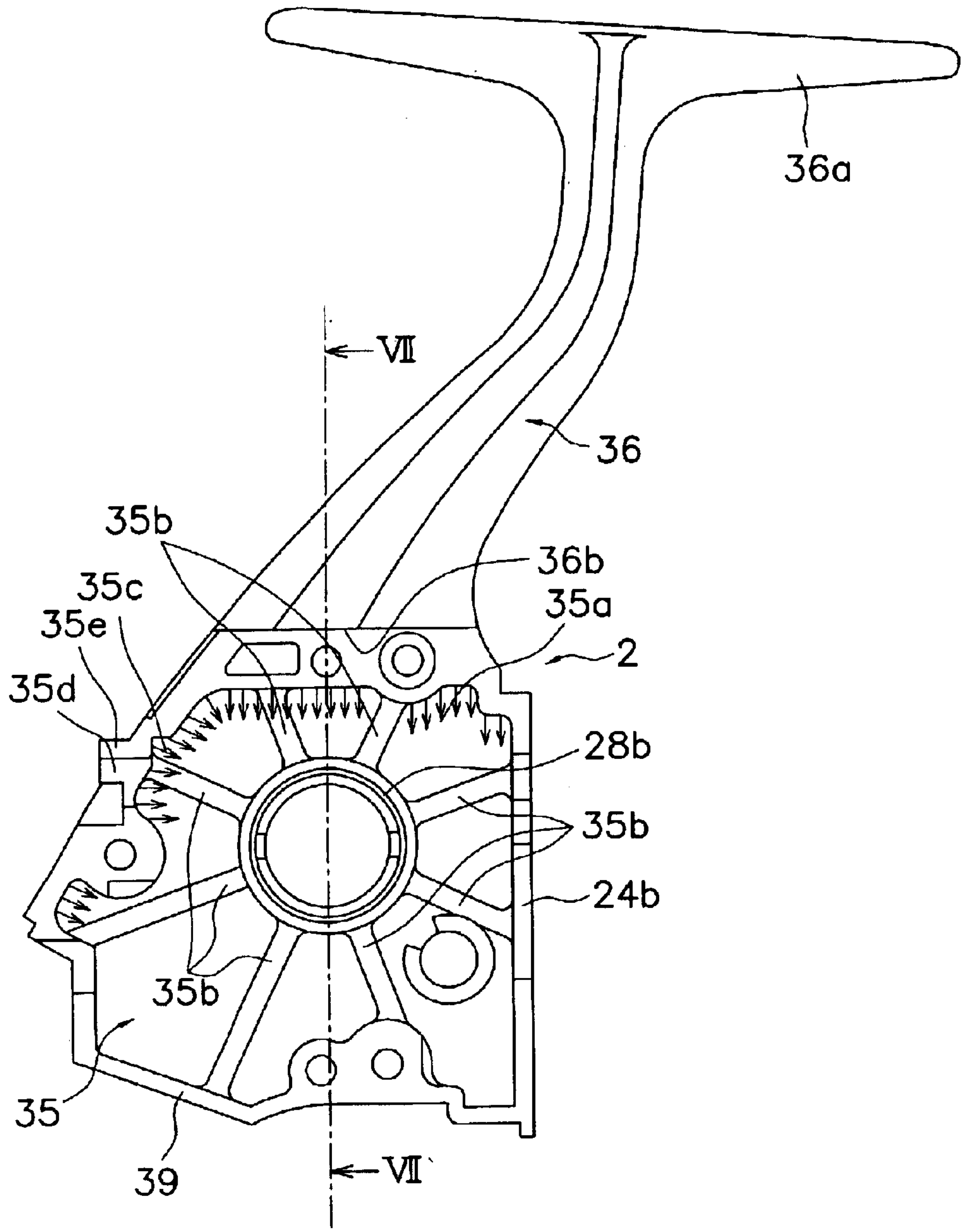
FIG. 6 is a side view of the lid portion according to a first embodiment of the present invention.
Figure 7:
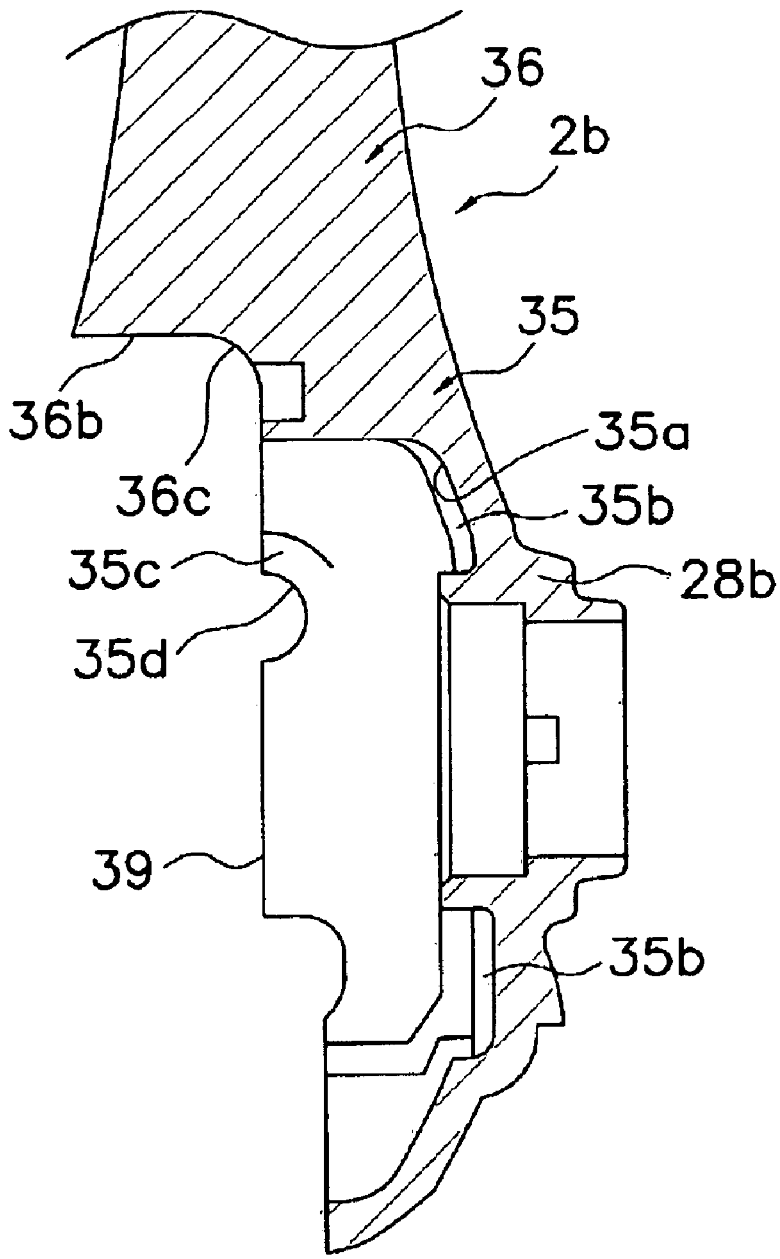
FIG. 7 is a cross-sectional view of the lid portion viewed along line VII—VII of FIG. 6.

The casing **2*a* is, for example, made of a polyamide-based synthetic resin reinforced by glass fibers, and is produced by injection molding. As shown in FIGS. 3 to 5, the casing 2*a* has an opening 25 formed at its side, a mechanism accommodating space 26 formed inside, a rotation support portion 27 and a first handle support portion 28*a*. The rotation support portion 27 is formed so as to be arranged inside the circular hollow 3*a* formed at the reel unit 2 side of the rotor 3, and is for rotatably supporting the rotation shaft (later-described pinion gear 12) of the rotor 3. The first handle support portion 28*a* comprises a boss portion for supporting one end of the handle shaft 10 that is the rotation shaft of the handle 1. The upper portion (the portion near the mounting side of a fishing rod) of the casing 2*a* has about the same thickness as an adjacent portion of a cover member 35, but the lower portion bulges towards the lid portion 2*b*** and is formed with a thickness greater than that of the upper portion.

The openings 25 are provided in three portions except in the front portion, namely, the upper, the lower, and the rear portions, to mount various mechanisms in the mechanism accommodating space 26. The openings 25 are formed with a step downward of the mid portion thereof according to the change in the thickness of the casing 2*a*. As shown in FIG. 2, the mechanism accommodating space 26 accommodates a rotor driving mechanism 5 for rotating the rotor 3, and an oscillation mechanism 6 for winding up the fishing line uniformly by shifting the spool 4 back and forth. The rotation support portion 27 is formed unitarily with the front portion of the first semi-circular flange portion 24*a* that is also formed unitarily into a substantially columnar shape in front of the mechanism accommodating space 26, and it has a through hole 27*a* (FIG. 2) through the center of which the pinion gear 12 passes. A one-way clutch 51 of the later-described reverse rotation prevention mechanism 50 is screwed fast on the front face of the rotation support portion 27.

At the rear of the casing 2*a*, as shown in FIGS. 2 and 5, a pivot support portion 28*c* is formed to support an operation shaft 54 of an operation mechanism 52 of the reverse rotation prevention mechanism 50. The pivot support portion 28*c* is formed in a semi-circular shape protruding toward the lid portion 2*b*. The length of the pivot support portion 28*c* with respect to the direction of the operation shaft 54 is made shorter than in conventional configurations. The pivot support portion 28*c* is arranged in a space 35*c* formed inside of a trimmed portion 39 of the lid portion 2*b*. Therefore, it is sufficient if the lid portion 2*b* side has only a small semi-circular notch 35*d* for directly accommodating the operation shaft 54 instead of the pivot support portion 28*c*, so the relative strength of the notched portion of the lid portion 2*b* is maintained high. At the rear of the casing 2*a*, a protruding quarter-circle boss portion 28*d* is formed contacting an operation lever 53. The lid portion 2*b* is also provided with a boss portion 35*e* having a similar shape. The two boss portions 28*d* and 35*e* together form a substantially semi-circular boss portion.

The lid portion 2*b* is made of, for example, a polyamide-based synthetic resin reinforced by glass fibers, and is manufactured by injection molding. As shown in FIGS. 3, 4, 6, and 7, the lid portion 2*b* has a thin-walled cover portion 35 and a mounting leg portion 36. The cover portion 35 is formed unitarily with the second flange portion 24*b* serving as a wall portion at the rotor such that the cover portion 35 covers the opening 25 of the casing 2*a*, and that the flange portions 24*a* and 24*b* and the cover portion 35 define a space in the interior. The flange portions 24*a* and 24*b* also cover a circular hollow of the rotor 3, such that the flange portions can prevent foreign matter such as water or liquids from entering the hollow 3*a*. The mounting leg portion 36 extends upwardly from the cover portion 35. The upper portion of the cover portion 35 has about the same thickness as the adjacent portion of the case 2*a*, and the lower portion becomes thinner as the casing 2*a* bulges toward it. In the upper portion and the rear portion of the cover portion 35 except the front portion, a trimmed portion 39 is formed opposing the opening 25. In the trimmed portion 39, a step is formed so that it is in close contact with the opening 25. At the front of the cover portion 35, a substantially semi-circular second flange portion 24*b* of the flange portion 2*c* is formed. An inner side portion of the second flange portion 24*b* that protrudes inwardly has the function to serve as a wall portion for reinforcing the cover portion 35. On one side of the cover portion 35, a second handle support portion 28*b* comprising a boss portion for supporting the other end of the handle shaft 10 is formed. From an upper portion of the trimmed portion 39 of the cover portion 35 toward the second handle support 28*b*, a varied-wall-thickness portion 35*a*, which is indicated by arrows in FIGS. 6 and 7, has an arched surface chamfered with a radius of, for example, about 6 mm so that the wall thickness does not change abruptly from the mounting leg portion 36. As a result of this, local stress concentrations can be relaxed, and at the same time, the fluid flow during resin molding is improved, preventing defective moldings. In addition, on the inner side face of the second handle support portion 28*b*, reinforcing ribs 35*b* are radially formed.

The mounting leg portion 36 is a solid, thick-walled member, one end of which extends both forward and backward and forms a fishing rod-mounting portion 36*a*. The boundary portion between the cover portion 35 and the mounting leg portion 36 is cut out at approximately half the thickness, and the upper portion of the casing 2*a* is inserted into the cut-out portion so that the outer side faces are smoothly connected. In this cut-out portion 36*b* as well, a connecting portion 36*c* (FIG. 7) connected with the trimmed portion 39 has an arched surface chamfered with a radius of, for example, about 3 mm in order to prevent stress concentration.

The flange portion 2*c* is formed into a disk-like shape and arranged in substantially the same plane as the edge face of the circular hollow 3*a* formed in the rear of the rotor 3, thus covering the circular hollow 3. As mentioned previously, the flange portion 2*c* includes the substantially semi-circular first flange portion 24*a*, which is formed unitarily with the casing 2*a*, and the semicircular second flange portion 24*b*, which is formed unitarily with the cover portion 35 of the lid portion 2*b* and forms a circle together with the first flange portion 24*a*. Since these flange portions 24*a* and 24*b* are thus formed unitarily with the casing 2*a* and the cover portion 35, the relative strength of the casing 2*a* and the cover portion 35 can be maintained at a high degree. At the same time, deformations during the molding can be prevented and a high degree of precision can be maintained.

On the rear surface of the mounting leg portion 36 of the reel unit 2, a name plate 37 is fixed. To a lower portion of the rear surface of the reel unit, a protective cover 38 is mounted.

The name plate 37 is made of a synthetic resin and is mounted to a long groove 36*d* (FIG. 2) formed on the mounting leg portion 36. The name plate 37 has a body portion 37*a* arranged along the rear surface of the mounting leg portion 36, three protruding portions 37*b* formed unitarily with the body portion 37*a* and mounted to the long groove 36*d*, and an interlocking tongue 37*c* formed at the lower end of the body portion 37*a* and interlocking at an upper portion of the casing 2*a*. The interlocking tongue 37*c* is fastened between the casing 2*a* and the cover portion 35 so that it can reliably prevent the name plate from coming off.

The protective cover 38 is, for example, made of a synthetic resin, such as ABS resin, that is metal-treated, or made of a stainless alloy so that it cannot be easily damaged, and it is for protecting the portion of the reel unit 2 that is most susceptible to damage.

As shown in FIG. 2, the rotor drive mechanism 5 includes a master gear 11 that is a face gear rotating with the handle shaft 10 to which the handle 1 is fixed, and a pinion gear 12 that meshes with the master gear 11. The pinion gear 12 that is the rotation shaft of the rotor 3 is tubular, its front 12*a* penetrates the center of the rotor 3 and is fixed to the rotor 3 by a nut 13. The pinion gear 12 is rotatably supported by the reel unit 2 at its mid-portion and rear end respectively by a bearing 14*a* mounted to the rotation support portion 27 and a bearing 14*b* arranged further rearward.

The oscillating mechanism 6 is a device that causes a spool shaft 15, coupled via a drag mechanism 60 to the spool 4 through its center, to reciprocate, which pumps the spool 4 in the same direction. The oscillating mechanism 6 has: a worm shaft 21 disposed below and parallel to the spool shaft 15; a slider 22 that travels back and forth along the worm shaft 21; and an intermediate gear 23 fixed to the front end of the worm shaft 21. The rear end of the spool shaft 15 is fixed non-rotatably to the slider 22. The rear end of the spool shaft 15 is non-rotatably fixed to the slider 22. The intermediate gear 23 meshes with the pinion gear 12 via a braking mechanism, which is not shown in the drawings. Thus, the speed with which the oscillating mechanism 6 shifts back and forth is slowed down, and the fishing line can be packed densely onto the spool 4.

The first and the second handle support portions 28*a* and 28*b* are cylindrical portions that are provided in the casing 2*a* and in which a bearing, which is not shown in the figures, is mounted.

As shown in FIG. 2, the rotor 3 includes a cylindrical portion 30, and first and second rotor arms 31 and 32 opposing each other provided on the sides of the cylindrical portion 30. The cylindrical portion 30 and the two rotor arms 31 and 32 are formed unitarily.

A front wall 33 is provided at the front portion of the cylindrical portion 30, and a boss portion 33*a* is formed in the middle of the front wall 33. The front portion 12*a* of the pinion gear 12 and the spool shaft 15 pass through a through-hole of the boss portion 33*a*. A nut 13 is arranged at the front portion of the front wall 33, and the nut 13 is screwed into a thread portion at the front end of the pinion gear 12. In the cylindrical portion 30, the portion rearward from the front wall 33 is a hollow 3*a*, and the flange portion 2*c* is formed unitarily with the casing 2*a* and the lid portion 2*b*, flush with the rear end face of the hollow 3*a*.

A first bail-support member 40 is fitted pivotally onto the outer peripheral side of the front end of the first rotor arm 31. A line roller 41 for guiding fishing line onto the spool 4 is fitted to the front end of the first bail-support member 40. A second bail-support member 42 is fitted pivotally onto the outer peripheral side of the front end of the second rotor arm 32. A bail 43 is provided between the line roller 41 at the front end of the first bail-support member 40 and the second bail-support member 42. These first and second bail-support members 40 and 42, the line roller 41, and the bail 43 together form a bail arm 44.

A reverse rotation prevention mechanism 50 for prohibiting/releasing reversal of the rotor 3 is disposed within the cylindrical portion 30 of the rotor 3. The reverse rotation prevention mechanism 50 has a roller-type one-way clutch 51, and an operation mechanism 52 for switching the one-way clutch 51 between an operational state and a non-operational state. The outer race of the one-way clutch 51 is fixed to the rotation support portion 27, and the inner race thereof is non-rotatably interlocked with the pinion gear 12. The operation mechanism 52 has an operation lever 53 disposed between the casing 2*a* and the lid portion 2*b*, and an operation shaft 54 provided with the operation lever 53 at its rear end and mounted pivotally to the casing 2*a*. The operation mechanism 52 can switch the one-way clutch 51 between the operational state and the non-operational state by pivoting the operation lever 53 and thereby pivoting a cam protrusion (not shown in the figures) at the front end of the operation shaft 54. When the one-way clutch 51 is in the operational state, reverse rotation of the rotor 3 is impossible, whereas when in the non-operational state, reverse rotation of the rotor 3 is possible.

The spool 4 is arranged between the first rotor arm 31 and the second rotor arm 32 of the rotor 3, and is mounted to the front end of the spool shaft 15 with the drag mechanism 60 interposed between the spool shaft 15 and the spool 4. The spool 4 has a bobbin trunk portion 4*a* onto which fishing line is wound, a skirt portion 4*b* that is formed unitarily on the rear of the bobbin trunk portion 4*a*, and a front flange portion 4*c* fixed to the front end of the bobbin trunk portion 4*a*.

In the spinning reel thus configured, the lid portion 2*b*, in which the thick-walled mounting leg portion 36 is formed unitarily with the cover portion 35, is provided separately from the thin-walled casing 2*a* for accommodating various drive portions. Therefore, a high degree of precision for the casing 2*a* can be maintained, and a high degree of strength of the mounting leg portion 36 can also be maintained. In addition, the mounting leg portion 36 is formed unitarily with the cover portion 35, and therefore, the relative strength can be maintained with a simpler structure than if they are separately provided. Moreover, the first flange portion 24*b*, serving as a wall portion, is formed unitarily with the cover portion 35. Therefore, the entire cover portion has a box-like shape enclosing a space therein. Consequently, stress is distributed, and the relative strength of the cover portion is increased. Furthermore, because stress is distributed, deformations during the molding do not occur easily, and a high degree of precision can be maintained. For these reasons, even when the lid portion 2*b* including the cover portion 35 is made of a synthetic resin or the like, which has a low relative strength, a high degree of precision and relative strength can be maintained. In addition, since the lid portion 2*b* including the cover portion 35 is made of a synthetic resin, weight reduction can be achieved at low cost.

Second Embodiment

Figure 8:
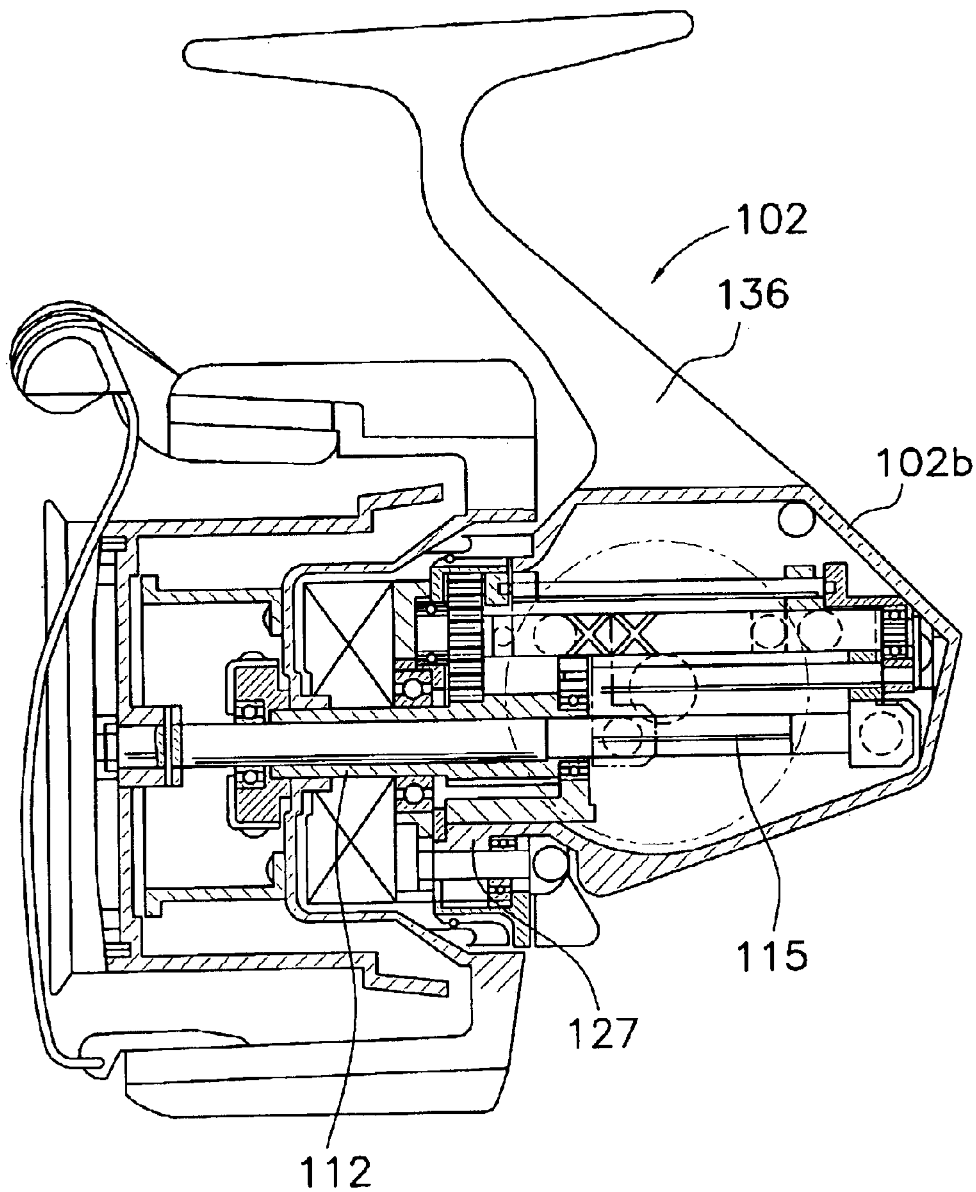
FIG. 8 is a cross-sectional side view of a spinning reel in accordance with a second embodiment.
Figure 9:
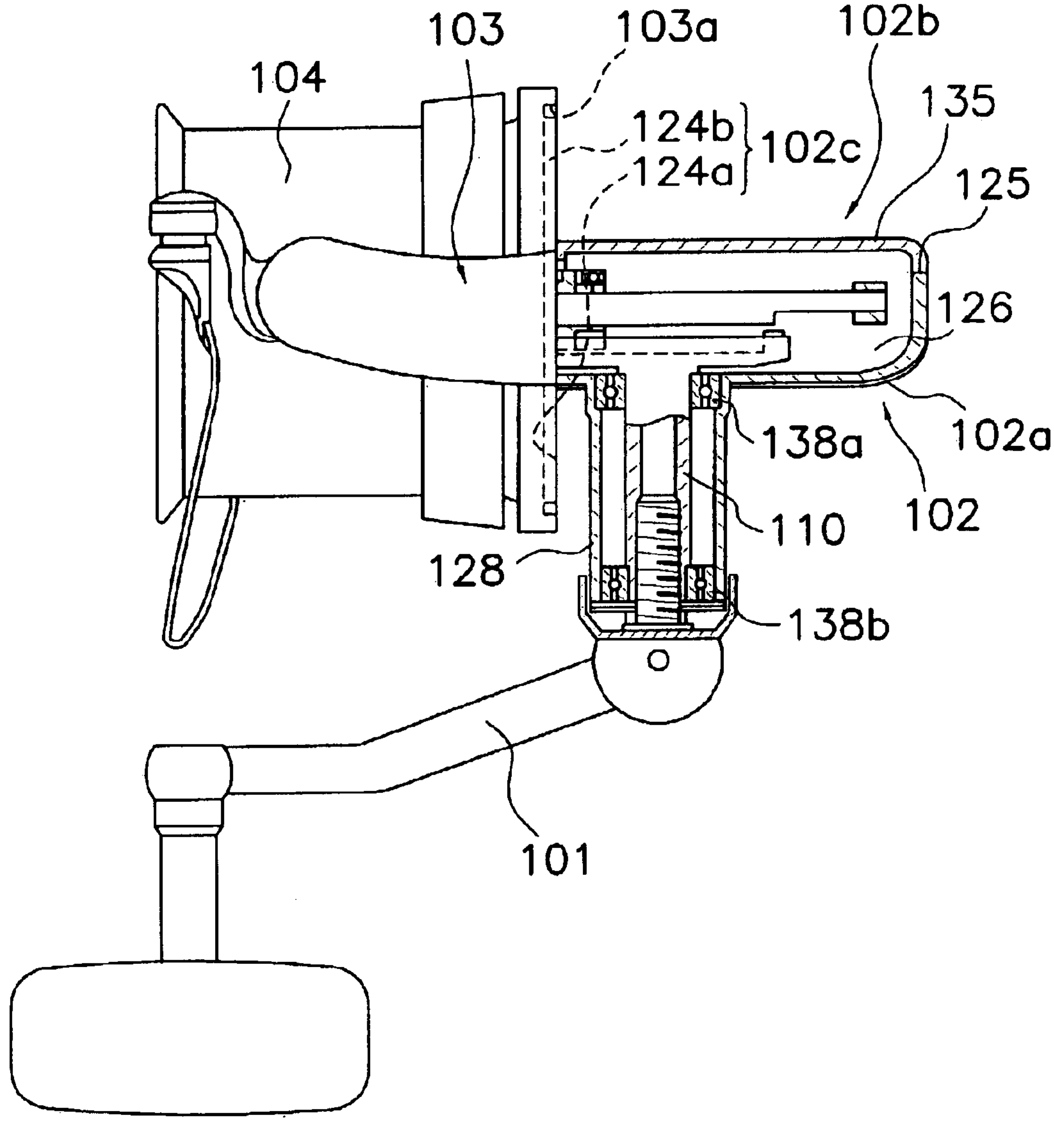
FIG. 9 is a plan view of a spinning reel in accordance with a second embodiment with a portion of the spinning reel removed.

In the first embodiment, the handle shaft 10 is supported by the casing 2*a* and the lid portion 2*b*, but as shown in FIGS. 8 and 9, it is also possible to support a handle shaft 110 by only the casing 102*a*.

As seen from FIGS. 8 and 9, the spinning reel principally includes a reel unit 102 to which the handle 101 is rotatably mounted, a rotor 103, and a spool 104.

The reel unit 102 principally has a casing 102*a* for supporting the rotor 103 and the spool 104, the lid portion 102*b* detachably screwed to the casing 102*a*, and a circular flange portion 102*c* including first and second flange portions 124*a* and 124*b* respectively formed unitarily with the casing 102*a* and the lid portion 102*b*.

The casing 2*a* is a thin-walled member made of, for example, an aluminum alloy. The casing 2*a* has an opening 125 formed at its side, a mechanism accommodating space 126 formed inside, a rotation support portion 127 that is formed so as to be arranged inside the circular hollow 103*a* formed at the reel unit 102 side of the rotor 103 and rotatably supports the rotation shaft (pinion gear 112) of the rotor 103, and a handle support portion 128 comprising a boss portion for supporting the handle shaft 110 that is the rotation shaft of the handle 101. To the handle support portion 128, two bearings 138*a* and 138*b* are mounted at a certain spacing, and the handle shaft 110 is supported by only the casing 102*a*.

The lid portion 102*b* is made of, for example, an aluminum alloy. The lid portion 102*b* has a thin-walled cover portion 135 for covering the opening 125 of the casing 102*a*, and a mounting leg portion 136 extending upward from the cover portion 135. The first flange portion 124*b* of the flange portion 102*c* is formed unitarily with the front portion of the cover portion 135.

Except that the spool 104 is non-rotatably mounted to the spool shaft 115, the configuration of the spinning reel is substantially the same as that in the first embodiment, and is therefore not further elaborated upon.

Also with the reel unit 102 thus configured, in the cover portion 135, the first flange portion 124*b* is formed unitarily with the cover portion 135 in addition to the portion covering the opening 125. Therefore, the entire cover portion 135 has a box-like shape enclosing a space therein. Consequently, stress is distributed, and the relative strength of the cover portion 135 is increased. Furthermore, because stress is distributed, deformations during the molding do not occur easily, and a high degree of precision can be maintained. For these reasons, even when the lid portion 102*b* including the cover portion 135 is made of an aluminum alloy or the like, which has a low relative strength, a high degree of precision and relative strength can be maintained. In addition, since the lid portion 102*b* including the cover portion 35 is made of alight weight metal such as an aluminum alloy, weight reduction can be achieved at low cost.

Other Embodiments (a) Types of spinning reels are not limited to the foregoing embodiments. The present invention can be suitably applied to spinning reels having a drag mechanism or a braking mechanism having a brake lever instead of the reverse rotation prevention mechanism.

(b) The shapes of the mounting leg portion and the cover portion are not limited to the foregoing embodiments.

(c) The foregoing embodiments have described for the case that the first flange portion 24*a* and the second flange portion 24*b* are formed unitarily with the casing 2*a* and the cover portion 35, but as long as the wall portion that is the inner portion protruding inward of the second flange portion 24*b* is formed unitarily with the cover portion 35, other portions may be formed separately.

According to the present invention, in the cover portion, a wall portion is formed unitarily therewith at the side to which the rotor is to be mounted, in addition to the portion that covers the opening, and therefore, the entire cover portion has a box-like shape enclosing a space therein. Thus, stress is distributed and the relative strength of the cover portion is increased. Moreover, because stress is distributed, deformations do not occur easily during the molding, and a high degree of precision can be maintained. Consequently, even when the lid portion including the cover portion is made of a synthetic resin or an aluminum alloy, which has a low relative strength, it is possible to maintain a high degree of precision and relative strength. In addition, if the lid portion including the cover portion is made of an aluminum alloy or a synthetic resin, weight reduction can be achieved at low cost.

As used herein, the following directional terms "forward," "rearward," "above," "downward," "vertical," "horizontal," "below" and "transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-28219. The entire disclosure of Japanese Patent Application No. 2002-28219 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A reel unit for a spinning reel that is mounted to a fishing rod and has a rotor that rotates in cooperation with rotation of a handle for winding fishing line onto a spool, said reel unit comprising:

a casing forming a mechanism accommodating space inside, said casing including an opening formed at its side and a rotation support portion for supporting a rotation shaft of the rotor, said rotation support portion being adapted to be arranged inside a circular hollow formed at a reel unit side of the rotor;

a lid portion having a cover portion and a mounting leg portion, said cover portion being detachably fixed to said casing to cover said opening of said casing, said mounting leg portion extending from said cover portion and having a front end to which the fishing rod can be attached; and a wall portion formed unitarily with said lid portion on a rotor side of said lid portion such that said wall portion and said lid portion define a space inside.

2. The reel unit for spinning reel as set forth in claim 1, further comprising a substantially circular flange portion having a first flange portion and a second flange portion, said first flange portion being arranged on substantially the same plane as the end face of the hollow and adjacent to said casing, said second flange portion being provided with said wall portion such that said first and second flange portions cover the hollow together.

3. The reel unit for spinning reel as set forth in claim 2, wherein said second flange portion is formed unitarily with said wall portion.

4. The reel unit for spinning reel as set forth in claim 2, wherein said first flange portion is formed unitarily with said casing.

5. The reel unit for spinning reel as set forth in claim 2, wherein said cover portion has a trimmed portion formed continuously with said second flange portion and formed on a circumference opposing said opening of said casing.

6. The reel unit for spinning reel as set forth in claim 1, wherein said casing and said lid portion are made of a synthetic resin.

7. The reel unit for spinning reel as set forth in claim 1, wherein said casing and said lid portion are made of a light weight metal.

8. The reel unit for spinning reel as set forth in claim 1, wherein said lid portion has a handle support portion for supporting the handle.

9. The reel unit for spinning reel as set forth in claim 8, wherein said casing has a handle support portion for supporting the handle.

10. The reel unit for spinning reel as set forth in claim 9, wherein said cover portion further includes reinforcing ribs that are formed on an inner side of said handle support portion.

11. A spinning reel adapted to be mounted to a fishing rod, comprising:

a handle;

a reel unit rotatably supporting said handle, said reel unit including a casing forming a mechanism accommodating space inside, said casing including an opening formed at its side and a rotation support portion for supporting a rotation shaft of a rotor, said rotation support portion being arranged inside a circular hollow formed at a reel unit side of said rotor, a lid portion having a cover portion and a mounting leg portion, said cover portion being detachably fixed to said casing to cover said opening of said casing, said mounting leg portion extending from said cover portion and having a front end to which the fishing rod can be attached, and a wall portion formed unitarily with said lid portion on the rotor side of said lid portion such that said wall portion and said lid portion define a space inside;

the rotor rotatably supported at a front of said reel unit and having the hollow on a reel unit side; and a spool disposed at a front of said rotor so as to be shiftable back and forth.

12. The spinning reel as set forth in claim 11, further comprising a flange portion having a first flange portion and a second flange portion, said first flange portion being arranged adjacent to said casing, said second flange portion provided with said wall portion such that said first and second flange portions cover said hollow of said rotor.

13. The spinning reel as set forth in claim 12, further comprising said second flange portion is formed unitarily with said wall portion.

14. The spinning reel as set forth in claim 12, wherein said first flange portion is formed unitarily with said casing.

15. The spinning reel as set forth in claim 12, wherein said cover portion has a trimmed portion formed continuously with said second flange portion and formed on a circumference opposing said opening of said casing.

16. The spinning reel as set forth in claim 11, wherein said casing and said lid portion are made of a synthetic resin.

17. The spinning reel as set forth in claim 11, wherein said casing and said lid portion are made of a light weight metal.

18. The spinning reel as set forth in claim 11, wherein said lid portion has a handle support portion for supporting said handle.

19. The spinning reel as set forth in claim 11, wherein said casing has a handle support portion for supporting the handle.

20. The spinning reel as set forth in claim 19, wherein said cover portion further includes reinforcing ribs that are formed on an inner side of said handle support portion.

* * * * *